United States Patent [19]
Heider

[11] Patent Number: 5,405,667
[45] Date of Patent: Apr. 11, 1995

[54] PLASTIC CONTAINER WITH MULTILAYER LABEL APPLIED BY IN-MOLD LABELING

[75] Inventor: James E. Heider, Toledo, Ohio

[73] Assignee: Owens-Illinois, Inc., Toledo, Ohio

[21] Appl. No.: 988,374

[22] Filed: Dec. 7, 1992

Related U.S. Application Data

[60] Continuation of Ser. No. 752,414, Aug. 30, 1991, abandoned, which is a continuation of Ser. No. 429,355, Oct. 31, 1989, Pat. No. 5,079,057, which is a division of Ser. No. 195,457, May 16, 1988, Pat. No. 4,904,324, which is a continuation of Ser. No. 947,144, Dec. 29, 1986, abandoned.

[51] Int. Cl.⁶ .................... B65D 23/08; B32B 7/10
[52] U.S. Cl. .................... 428/36.5; 428/35.7; 428/36.92; 428/215; 428/317.1; 428/349; 428/516; 215/1 C
[58] Field of Search ................ 428/516, 215

[56] References Cited

U.S. PATENT DOCUMENTS

| | | | |
|---|---|---|---|
| 3,108,850 | 10/1963 | Brandt | 264/509 |
| 3,174,887 | 3/1965 | Voelker | 156/79 |
| 4,264,657 | 4/1981 | Tollette | 428/40 |
| 4,528,221 | 7/1985 | Komatsuzaki | 428/36.5 |
| 4,585,679 | 4/1986 | Karabedian | 428/36.5 |
| 4,601,926 | 7/1986 | Jabarin et al. | 215/1 C |
| 4,626,455 | 12/1986 | Karabedian | 428/36.5 |
| 4,661,188 | 4/1987 | Fumei | 156/244.11 |
| 4,743,488 | 5/1988 | Jones | 428/317.1 |
| 4,883,697 | 11/1989 | Dornbusch | 428/35.7 |
| 4,904,324 | 2/1990 | Heider | 156/214 |
| 5,079,057 | 1/1992 | Heider | 428/36.5 |

Primary Examiner—Henry F. Epstein
Assistant Examiner—Rena L. Dye

[57] ABSTRACT

A plastic container having a multilayer label applied by in-mold labeling during the blow molding of the plastic container. The label comprises a non-cellular inner layer, an intermediate cellular layer compatible with the inner layer and heat bonded to the inner layer, and an outer non-cellular plastic layer compatible with the intermediate cellular layer and heat bonded thereto. The label is positioned in a mold cavity with the outer layer in contact with the mold. When a hot plastic parison at molding temperature is expanded by fluid pressure against the walls of the mold to form a container, the noncellular inner layer becomes bonded to the outer surface of the container by heat from the container.

6 Claims, 1 Drawing Sheet

PLASTIC CONTAINER WITH MULTILAYER LABEL APPLIED BY IN-MOLD LABELING

This is a continuation of application(s) Ser. No. 07/752,414 filed on Aug. 30, 1991 now abandoned, which is a continuation of prior application Ser. No. 07/429,355 filed Oct. 31, 1989, now U.S. Pat. No. 5,079,057 which was in turn a division of application Ser. No. 07/195,457 filed May 16, 1988, now U.S. Pat. No. 4,904,324, which was in turn a continuation of application Ser. No. 06/947,144 filed Dec. 29, 1986, now abandoned.

This invention relates to plastic containers having labels applied thereto and particularly to plastic containers having plastic labels applied thereto by in-mold labeling during the blow molding of the container.

BACKGROUND AND SUMMARY OF THE INVENTION

In the use of plastic containers, it becomes necessary to apply labels. It has been found that applying the labels during the molding process reduces costs of manufacture and produces an attractive container. More specifically, when a hollow parison or preform is expanded against the surface of the mold having a label on a side wall of the mold cavity so that when the plastic is expanded, it causes an adhesive on the label to be heated and thereby adhere the label to the container. One common type of label that is used is a paper label. However, the use of such a label has inherent problems in that when the plastic container cools, the plastic and paper have different rates of shrinkage and, as a result, the paper wrinkles and stresses occur in the adhesive. Another problem with the use of paper labels is that any rejected containers cannot be reprocessed until the paper label is removed. It is therefore been common to discard the entire container or, at most, cut off the neck of the container and discard the remainder.

Expired U.S. Pat. Nos. 3,108,850 and 3,207,822 discuss the use of plastic labels without adhesive. Pat. No. 3,108,850 contemplates the use of an insulator comprising a paper layer or plastic layer between the mold and the plastic parison. The insulating part is connected to the label by either a temporary readily strippable connection for quick removal or a relatively permanent connection so that the insulation remains with the label on the completed container to form the decorated outer surface. Pat. No. 3,207,822 contemplates a plastic label made of a material similar to that used in making the bottle that becomes bonded to the container by the heat and pressure of blowing the container. The patent also contemplates coarsely roughening the surface of the mold to facilitate bonding of the label to the container. As far as I am aware, such efforts were not commercially successful and, at the present time, adhesive is used in all labels wherein the labels are applied by the inmolding process.

Accordingly, there is need for providing a blown plastic container which has a label applied by the in-mold labeling process that avoids the use of adhesive; which is low in cost; which results in a container that is readily recyclable; and which produces an attractive appearance offering various aesthetic effects.

In accordance with the invention, the plastic container embodying the invention comprises a plastic container having a multilayer label applied by in-mold labeling during the blow molding of the plastic container. The label comprises a non-cellular inner layer, an intermediate cellular layer compatible with the inner layer and heat bonded to the inner layer, and an outer non-cellular plastic layer compatible with the intermediate cellular layer and heat bonded thereto. The label is positioned in a mold cavity with the outer layer in contact with the mold. When a hot plastic parison at molding temperature is expanded by fluid pressure against the walls of the mold to form a container, the non-cellular inner layer becomes bonded to the outer surface of the container by heat from the container.

DESCRIPTION

Figure 1:
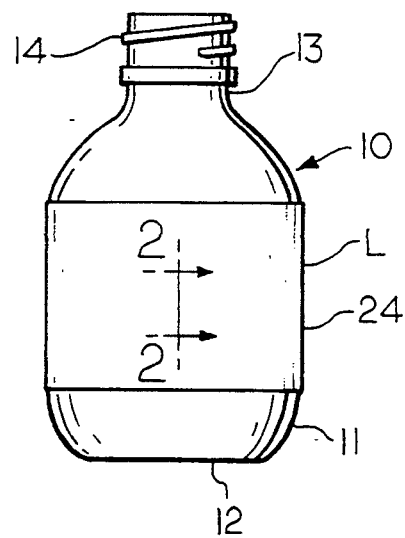
FIG. 1 is a side elevational view of a plastic container embodying the invention.
Figure 2:
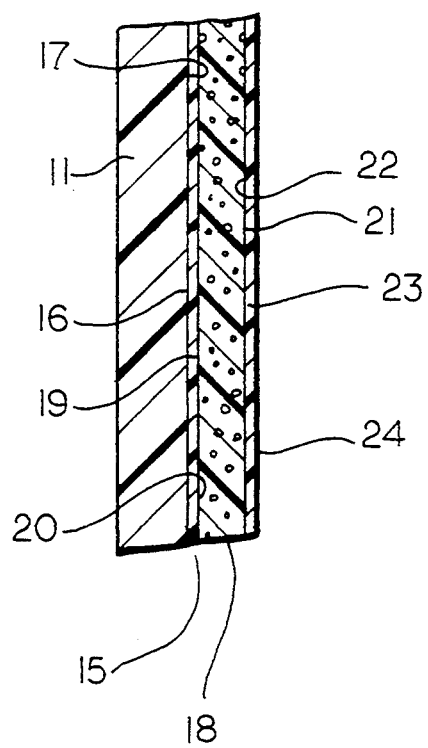
FIG. 2 is a fragmentary sectional view on an enlarged scale taken along the line 2—2 in FIG. 1.

Referring to FIGS. 1 and 2, the plastic container embodying the invention is shown as comprising a hollow container 10 having a side wall 11, a bottom wall 12 and a neck 13 with a thread 14 thereon. The container is made by conventional blow molding techniques wherein a hollow preform or parison at the blow molding temperature is enclosed in a hollow mold which has a label suitably held against a surface of the cavity of the mold by, for example, vacuum, and the parison is expanded or blown outwardly against the confines of the mold so that the label is bonded to the outer surface of the side wall 11 of the resultant container.

Referring to FIG. 2, the label L comprises an inner non-cellular plastic layer 15 which is heat bonded at its inner surface 16 to the outer surface 17 of the wall 11 of the container; an intermediate cellular plastic layer 18 which has an inner surface 19 bonded to the outer surface 20 of the inner layer 15 and an outer surface 21 which is heated bonded to the inner surface 22 of an outer non-cellular plastic layer 23. The outer surface 24 of the outer layer 23 is formed with suitable indicia such as printing to produce identification as well as desired aesthetic effects.

In order to provide the heat bonding desired to produce the container without the use of adhesives, the various layers must be compatible at their contacting surfaces, that is, they must be heat bondable.

The label L is preferably made by coextrusion, as is well known in the art, during which the uniformly thick layers 15, 18, 23 are heat bonded to one another.

The resultant label L preferably has a thin inner layer, a relatively thick intermediate layer 18, and a thin outer layer. The inner and outer layers, if made of the same material, should have substantially the same thickness in order that the label will remain flat. If the inner layer is made of a material having lesser mechanical properties, it can be thinner without affecting the curl.

Furthermore, the major portion of the total thickness of the label L comprises the intermediate cellular layer 18. In a typical example, the total thickness of label L might be 6 mils and the inner and outer layers each having a thickness of 0.5 mil. In addition, the inner surface 17 of the inner layer 15 preferably is roughened in order to avoid the formation of air bubbles and insure a proper bond with the wall 11.

In a preferred form, the labels are intended to be applied to containers made of olefin plastics and the various layers of the labels are also made of olefin plastics.

It has been found that when labels L are applied to plastic containers by conventional in-molding techniques, the inner layer is reheated and adheres to the bottle surface without the use of adhesives since it is compatible with the container and is very thin resulting in a very low specific heat. However, it is insulated from the bulk or mass of the total label by the foam or cellular layer 18. The low specific heat of the inner layer together with the insulating characteristics of the intermediate layer allows the surface of the inner layer to rapidly heat and melt bond to the outer surface of the container. The cellular intermediate layer also permits the inner surface of the label to reheat to the desired temperature for adhesion without distorting the label.

This may be contrasted to labels that comprise non-cellular cross sections wherein it is very difficult at normal blow molding temperatures to reheat the inner surface to a point at which complete bonding will occur.

The intermediate cellular foam layer is designed not only to insulate the inner surface of the inner layer but also to provide bulk or stiffness to the label without adding to the weight of the label. The resultant stiffness permits better handling in the mechanisms which are utilized to insert the label within the mold cavity.

Furthermore, the cellular layer produces a fine roughness on the inner surface of the inner layer provided paths for escape of air which could become entrapped between the container and label during the blow molding.

Tests have shown that complete adhesion between the label and container occur.

The inner layer is preferably of a material which has a melting point like that of the container. The outer layer preferably is made of material that has the desired characteristics for printing and background. Thus, the inner layer may comprise a low density plastic such as low density polyethylene and the outer layer may comprise a more rigid plastic such as high density polyethylene or high density polystyrene which have a smooth or make finish. A overlayer of varnish can be provided over the printing on the outer layer. Alternatively, a metallic film coating can be applied on the outer surface of the outer layer before printing to provide a metallic background for the printing.

Although in the preferred form, the label comprises an inner non-cellular layer, an intermediate cellular layer, some of the advantages of the invention can be obtained by a label comprising two layers, namely, an inner non-cellular layer and an outer cellular layer.

As indicated above, the polymeric materials respective and independently contemplated for cellular layer 18 and non-cellular layers 15, 23 are olefin polymers; that is, each of these polymeric layers will have as the predominant polymeric moiety a polymer of an olefin, preferably an olefin having 2–4 carbons, or mixtures thereof, e.g. the predominant moiety will be a polymer of ethene, propene, butene, like butene-1, or mixtures thereof, more commonly referred to as a polymer of ethylene, propylene or butylene. This includes homopolymers, copolymers of these olefins with other copolymerizable monoethylenically unsaturated monomers, wherein the olefin in the copolymerization is such that the moiety thereof in the final copolymer, that is the ethlene, propylene or butylene moiety, is at least about 60% by weight, and polymeric blends, or admixtures, wherein the resulting polymeric blend is at least about 60% by weight of a polymerized olefin moiety, e.g., at least about 60% of an ethlene moiety in the blend. The minor amounts, i.e., less than about 40% of the other moiety of material employed, are such as to supplement and compliment the basic properties of the olefin polymer and this applies whether other moieties are introduced by way of a polymer blend, or admixture, or by way of a copolymerized monomer. These other moieties, whether supplied by blending another polymer with a hommopolymerized olefin, e.g., homopolymerized ethene, (ethlene homopolymer), or by copolymerization therewith should not be such as to significantly interfere with the foamable, heat sealable, extrudable characteristics of the base olefin polymer and should be compatible, i.e., miscible with it.

Exemplary olefin homopolymers are ethylene, propylene and butylene homopolymers, with the former being especially preferred, and blends of these homopolymers. The terms polyethylene, polypropylene and polybutylene are used herein to include those material recognized and sold commercially under those names, even though those materials, strictly and technically, may be viewed by some to be a blend, or copolymer, since the material may include small amounts, typically less than about 5%, e.g., 0.5–3% by weight, of another polymeric moiety. For example, polyethylene is sold and recognized by that name when in fact it may be produced by copolymerization with 1–2 percent by weight of hexene, or butadiene, or may, by analysis, show several percent, e.g., 3–5% of vinyl acetate moiety; for practical purposes however these material consist of polyethylene.

The foregoing generally describes the composition of the polymeric portion of the cellular layer 18 and non-cellular films 15, 23, it being understood that the layers need not be of the same polymeric composition. It will, of course, be apparent that suitable adjuvants can be present in these layers if desired. Thus, for example, in addition to the polymeric material, the respective layers can include pigments, stabilizers and the like. Generally, excellent results will be obtained by selecting a polymeric composition for cellular layer 18 which has a melt index or melt flow of less than 5, for example, between about 0.1 to 5 and most desirably about 0.2 to 1 and the polymeric material selected for the non-cellular layers 15, 23 will have a melt index or melt flow of less than about 10. The preferred material for both the cellular layer 18 and the non-cellular layers 15, 23 is polyethylene, which includes low density polyethylene, for example, polyethylene having a density of less than 0.925 grams/cc, generally in the range of about 0.910 to about 0.925, high density polyethylene, for example, that having a density greater than about 0.941, typically about 0.941 to about 0.965, medium density polyethylene, and blends thereof. As regards the cellular layers, the density specified is prior to foaming. The foamed density of cellular layer is about 25–30 #/ft.$^3$ and the density of the composite laminate is about 35–40 #/ft.$^3$ While a sheet of stock material of the composite structure for use herein can be formed by various techniques, it is generally preferred to employ extrusion technology. This extrusion technology may take either of two conventional forms, one of which is extrusion coating and the other of which is the use of co-extrusion technology. The latter technique, however, is particularly highly preferred because of the apparent ability to form lower density composite structures. In the co-extrusion technique, while a slit die may be employed, the preferred practice is to employ an extrusion die which is possessed of an annular, circular opening and the composite structure is initially formed as a tubular shape by what is referred to in the art as a "blown bubble" technique. These types of coextrusion die is set forth in SPE Journal, November 1969, Vol. 25, page 20, entitled, "Co-Extrusion of Blown Film Laminates" and form no part of the present invention as such.

In this known co-extrusion technique, the circular opening is fed from two independent extruders and, in this particular instance, the extruder supplying the foamable material, intended to form cellular layer 18, preferably will feed the die so that this material forms the internal portion of the tubular extrusion; the extruder feeding the material intended to form non-cellular layers 15, 23 will preferably be fed to the die so as to form the internal and external portions of the tubular shape. The tubular member issuing from the extruder is blown into a bubble by conventional "bubble" forming techniques, including air cooling of the external surface thereof, and is then drawn through the nip of two juxtaposed rollers wherein the tubular member is compressed to form a flattened tube.

Suitable conventional foaming or blowing agents are employed to produce foaming and the cellular structure results, just as the extrudate leaves the die. This flattened tube is then contacted with cutting knives which slit the flattened tubular member along its edges (machine direction) so as to form a sheet or film of substantially uniform width; this sheet or film, which is at this point actually a sheet of two superimposed composite structures, for use herein, is separated into two independent sheets and wound onto independent winding wheels, which provides the stock of the heat shrinkable composite structure for use herein.

Although the invention has been described in connection with blow molded containers, it is also applicable to containers made from preforms by differential pressure as, for example, thermoforming of containers from flat or shaped preforms.

I claim:

1. A multilayer label adapted to be applied to a plastic container by in-mold labeling during the blow molding of the plastic container,
   said label consisting essentially of only three coextruded layers:
   a non-cellular plastic inner layer,
   an intermediate cellular plastic layer compatible with the inner layer heat bonded to the inner layer without adhesives,
   and an outer non-cellular plastic layer compatible with the intermediate cellular layer heat bonded to the intermediate layer without adhesives,
   said inner layer having an inner surface,
   said inner surface of said inner layer being free of a plastic surfacer, any adhesive and said inner layer being capable of heat bonding to
   said cellular layer comprising the major portion of the total thickness of the label.

2. The multilayer label set forth in claim 1 wherein inner and outer layers are of substantially the same thickness.

3. The multilayer label set forth in claim 1 wherein said inner and outer layers have a thickness of about 0.5 mils and the intermediate layer has a thickness of about 5 mils.

4. The multilayer label set forth in claim 1 wherein the cellular layer has a roughened surface adjacent the inner layer providing paths for escape of air which could become entrapped between a container and label during molding.

5. The multilayer label set forth in any one of claims 1–3 and 4 wherein said plastic layer comprise a material selected from the group of olefins.

6. A plastic container comprising
   a blow molded hollow body having an outer surface,
   a multilayer label,
   said label consisting essentially of only two coextruded layers:
   a cellular plastic layer,
   an inner non-cellular plastic layer compatible with the cellular layer and being heat bonded to the cellular layer without adhesives,
   said cellular layer comprising the major portion of the thickness of the label,
   said inner surface of said non-cellular inner layer being free of any adhesive and said inner layer being heat bonded to a plastic outer surface of the container,
   said label having been applied by in-mold labeling during the blow molding of a plastic container, the non-cellular plastic inner layer having been insulated by the cellular layer so that the heat from the container has heated the inner surface of the non-cellular plastic inner layer sufficiently such that the label is bonded by heat bonding to the outer surface of the container.

* * * * *

UNITED STATES PATENT AND TRADEMARK OFFICE
CERTIFICATE OF CORRECTION

PATENT NO.   :   5,405,667
DATED        :   April 11, 1995
INVENTOR(S)  :   James E. Heider It is certified that error appears in the above-indentified patent and that said Letters Patent is hereby corrected as shown below:

On the title page: Item

[73] Assignee: Owens-Illinois, Inc., should be --Owens-Illinois Plastic Products Inc.--

Column 6, lines 8-9, delete "a plastic surfacer,"

Column 6, line 10, after "to" insert --a plastic surface,--

Column 6, line 12, after "label" insert --wherein said cellular layer insulates said inner surface of said inner layer and provides stiffness to said label--

Signed and Sealed this

Tenth Day of December, 1996

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,405,667
DATED : April 11, 1995
INVENTOR(S) : James E. Heider

It is certified that error appears in the above-indentified patent and that said Letters Patent is hereby corrected as shown below:

Title page, item
[73] Assignee: Change Owens-Illinois, Inc. to --Owens-Illnois Plastic Products Inc., Toledo, Ohio--

Signed and Sealed this

Sixth Day of May, 1997

Attest:

Attesting Officer

BRUCE LEHMAN

Commissioner of Patents and Trademarks